(12) United States Patent
Szydlowski

(10) Patent No.: US 7,665,005 B2
(45) Date of Patent: Feb. 16, 2010

(54) IN SITU PROCESSOR MARGIN TESTING

(75) Inventor: Craig P. Szydlowski, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 11/509,856

(22) Filed: Aug. 25, 2006

(65) Prior Publication Data

US 2008/0082881 A1    Apr. 3, 2008

(51) Int. Cl.
*G06F 11/00* (2006.01)
*G06F 9/455* (2006.01)
(52) U.S. Cl. .......................................... 714/745; 718/1
(58) Field of Classification Search ...................... None
See application file for complete search history.

(56) References Cited

U.S. PATENT DOCUMENTS

| 7,124,327 | B2 * | 10/2006 | Bennett et al. | 714/38 |
| 7,191,440 | B2 * | 3/2007 | Cota-Robles et al. | 718/1 |
| 2008/0282241 | A1 * | 11/2008 | Dong | 718/1 |

* cited by examiner

*Primary Examiner*—Christine T Tu
(74) *Attorney, Agent, or Firm*—Thomas R. Lane

(57) ABSTRACT

Embodiments of apparatuses, methods, and systems for in situ processor margin testing are disclosed. In one embodiment, an apparatus includes virtual machine control logic and operating point control logic. The virtual machine control logic is to transfer control of the apparatus between a virtual machine monitor and a guest. The operating point control logic is to set the operating point of the apparatus in connection with a transfer of control of the apparatus to the virtual machine monitor.

8 Claims, 2 Drawing Sheets

METHOD 200

IN SITU PROCESSOR MARGIN TESTING

BACKGROUND

1. Field

The present disclosure pertains to the field of information processing, and more particularly, to the field of testing information processing systems for reliability.

2. Description of Related Art

Margin testing may be used as a valuable tool to improve the reliability, availability, and serviceability of information processing systems. Margin testing involves testing microprocessors and other system components across a range of operating conditions, such as input voltage and clock frequency, to determine the margin between the conditions at which the components are designed to operate and the conditions at which they fail. Special test patterns may be run in order to exercise as many transistors and nodes as possible. Margin testing may also involve comparing margins before and after stressing the components, to determine whether the stress causes the margins to decrease. Low margins or margins that decrease significantly due to stress may be a sign of manufacturing or other defects that may cause a component to degrade more rapidly than expected. Therefore, component manufacturers may use margin testing to screen out components that might otherwise be built into systems, degrade rapidly as the system is used, and then fail intermittently or catastrophically, thereby reducing the system's reliability, availability, and serviceability.

As feature dimensions in components used in information processing systems decrease, the components become more susceptible to degradation and failure due to the effects of hot electrons and dielectric breakdown. Therefore, even components that have been margin tested before being built into a system may fail prematurely. To attempt to identify these components before they fail, it may be desirable to be able to margin test components after they have been built into a system and put into operation ("in situ").

BRIEF DESCRIPTION OF THE FIGURES

The present invention is illustrated by way of example in, and is not limited by, the accompanying figures.

DETAILED DESCRIPTION

Embodiments of apparatuses, methods, and systems for in situ processor margin testing are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Testing processor margins in situ may provide for the administrator, manager, operator, or other user of a system to monitor the system for processors that may be likely to fail. A processor identified as likely to fail may be disabled or otherwise isolated from the other processors in the system, before its failure causes loss of data and/or system downtime. In situ processor margin testing may be especially valuable in military and other applications where system reliability is of utmost importance.

Figure 1:
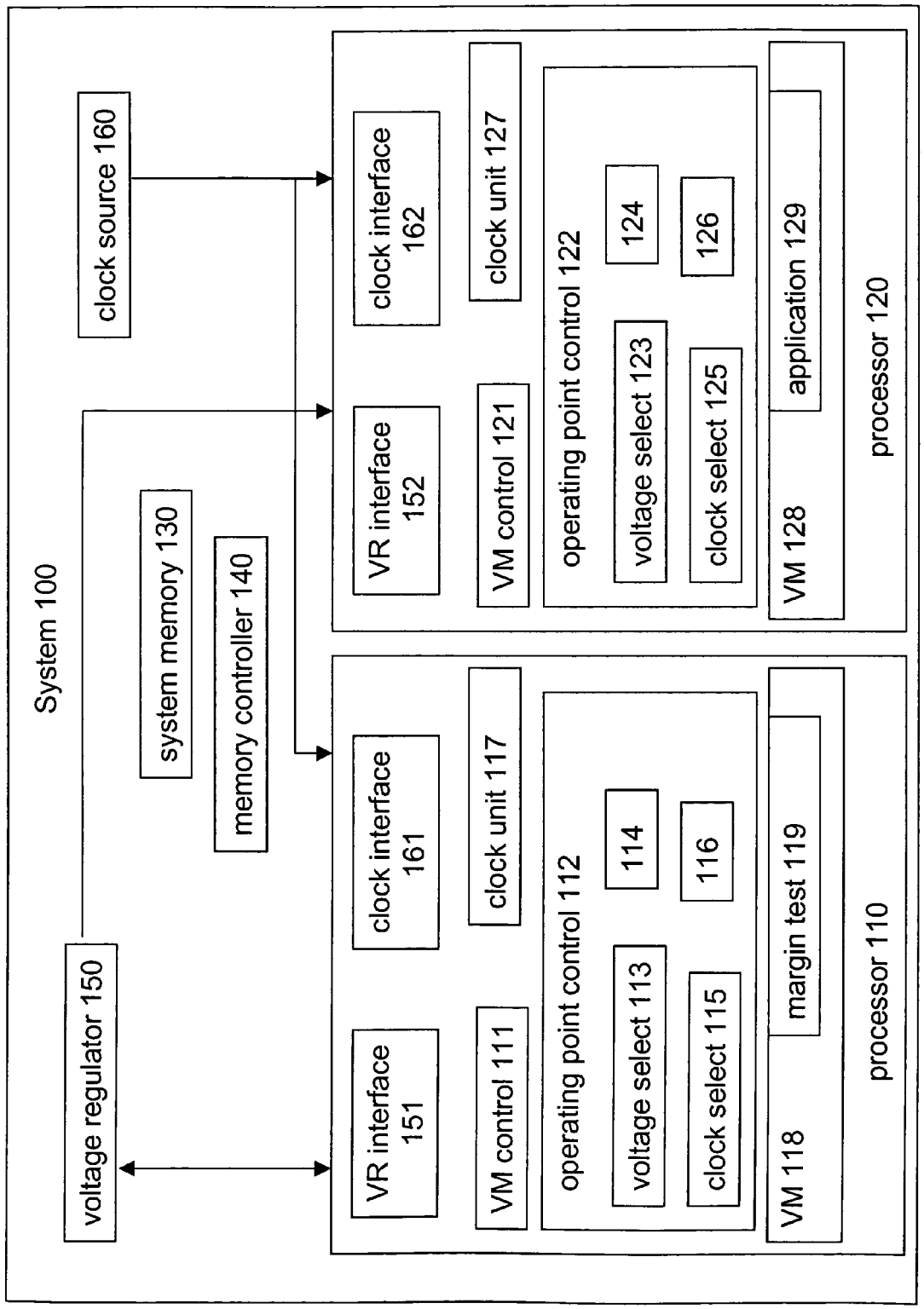
FIG. 1 illustrates an embodiment of the present invention in an information processing system.

FIG. 1 illustrates an embodiment of the present invention in system 100. System 100 may be any type of information processing system, such as a personal computer, a mainframe computer, a server, a portable computer, a handheld computing device, or an embedded processing device. In the embodiment of FIG. 1, system 100 includes processor 110, processor 120, system memory 130, memory controller 140, voltage regulator 150, and clock source 160.

Processor 110 may be any type of processor, including a general purpose microprocessor, such as a processor in the Intel® Pentium® Processor Family, the Itanium® Processor Family, or other processor family from Intel Corporation, or another processor from another company, or a digital signal processor or microcontroller. Processor 110 may be a single core processor, a multicore processor, or one or more cores of a multicore processor. Processor 120 may be the same type of processor as processor 110, or may be any other type of processor. In an embodiment where processor 110 is one or more cores of a multicore processor, processor 120 may be another one or more cores of the same multicore processor. Although FIG. 1 shows only two processors, system 100 may include any number of additional processors.

System memory 130 may be static or dynamic random access memory, semiconductor-based read-only or flash memory, magnetic or optical disk memory, any other type of medium readable by processors 110 and 120, or any combination of such mediums. Processors 110 and 120 are coupled to memory 130 through memory controller 140, which may include any logic to allow processors 110 and 120, and any other components that are not shown in FIG. 1, to read, write, or otherwise access memory 130. Memory controller 140 may also include any other logic to perform any other function, such as bridging transactions between a processor bus and a peripheral bus.

System 100 also includes voltage regulator 150 and clock source 160. Voltage regulator 150 may be any known voltage regulator to supply an input voltage to processor 110 and an input voltage to processor 120, where the input voltage is the voltage level applied to a power supply interface, pin, or pins of the processor. Voltage regulator 150 is coupled to processor 110 through interface 151 and to processor 120 through interface 152. Clock source 160 may be any known clock source to provide a clock signal to processor 110 and a clock signal to processor 120, where the clock signal is the clock signal applied to a system, bus, or other corresponding clock interface, pin, or pins of the processor. Clock source 160 is coupled to processor 110 through interface 161 and to processor 120 through interface 162.

In system 100, processor 110, processor 120, memory controller 140, and memory 130 may be coupled to or communicate with each other according to any known approach, such as directly or indirectly through one or more buses, point-to-point, or other wired or wireless connections. System 100 may also include any number of additional devices or connections.

Returning to processors 110 and 120, FIG. 1 also illustrates virtual machine control logic 111, operating point control logic 112, and clock unit 117 included in processor 110, and virtual machine control logic 121, operating point control logic 122, and clock unit 127 included in processor 120, along with margin test software 118 running on virtual machine 119 (as described below) on processor 110 and guest application software 128 running on virtual machine 129 (as described below) on processor 120.

Virtual machine control logic 111 is logic to enable or assist processor 110 to support virtualization, and virtual machine control logic 121 is logic to enable or assist processor 120 to support virtualization. Generally, the concept of virtualization in information processing systems means allowing multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest" software. A "host" or "host" software is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be "intercepted," i.e., cause the processor to exit the virtualization environment so that a VMM may operate, for example, to implement virtualization policies. A physical processor may also support other instructions for maintaining a virtualization environment, and may include memory or register bits that indicate or control virtualization capabilities of the physical processor.

A VMM may be any software, firmware, or hardware host installed on or accessible to system 100, to present VMs, i.e., abstractions of system 100, to guests, or to otherwise create VMs, manage VMs, and implement virtualization policies. A guest may be any OS, any application or other software, or the combination of an OS and application or other software.

Each guest expects to access physical resources, such as processor and platform registers, memory, and input/output devices, of system 100, according to the architecture of the processor and the platform presented in the VM. A resource that can be accessed by a guest may either be classified as a "privileged" or a "non-privileged" resource. For a privileged resource, a VMM facilitates the functionality desired by the guest while retaining ultimate control over the resource. Non-privileged resources do not need to be controlled by a VMM and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "virtualization events" herein. Some of these virtualization events are referred to as "privileged events" because they must be handled by a VMM to ensure proper operation of the VMs, protection of the VMM from guests, and protection of guests from each other.

At any given time, a processor may be executing instructions from a VMM or any guest, thus the VMM or the guest may be running on, or in control of, that processor. When a guest is running, and a privileged event occurs or a guest attempts to access a privileged resource, control may be transferred from the guest to the VMM. The transfer of control from a guest to a VMM is referred to as a "VM exit" herein. After handling the event or facilitating the access to the resource appropriately, the VMM may return control to a guest. The transfer of control from a VMM to a guest is referred to as a "VM entry" herein. Virtual machine control logic 111 and 121 include logic to transfer control of processors 110 and 120, respectively, from a host to a guest (i.e., a VM entry) and logic to transfer control of processors 110 and 120, respectively, from a guest to a host (i.e., a VM exit).

Returning to processors 110 and 120, operating point control logic 112 is to set the operating point of processor 110 and operating point control logic 122 is to set the operating point of processor 120. Generally, the operating point of a processor is the state of the operating conditions of the processor, such as the input voltage level and the clock frequency. The operating point of a processor may be set to an optimal condition, e.g., where each individual operating parameter is set to a level that is specified by the manufacturer of the processor as the typical level at which the processor was designed to operate. In the embodiment of FIG. 1, operating point control logic 112 includes logic to set the operating point of processor 110 to an optimal condition in connection with a VM exit on processor 110, and operating point control logic 122 includes logic to set the operating point of processor 110 to an optimal condition in connection with a VM exit on processor 120. Therefore, even if a guest is running on processor 110 or 120 at an operating point that is not optimal, the operating point will automatically be returned to the optimal condition for running the VMM.

More specifically, in this embodiment, operating point control logic 112 includes input voltage selection logic 113, and operating point control logic 122 includes input voltage selection logic 123. Input voltage selection logic 113 is to select the input voltage for processor 110, and input voltage selection logic 123 is to select the input voltage for processor 120. Operating point control logic 112 also includes input voltage storage location 114, which may be a programmable register or any other storage location that may be set by software to indicate a desired input voltage for processor 110, and operating point control logic 122 also includes input voltage storage location 124, which may be a programmable register or any other storage location that may be set by software to indicate a desired input voltage for processor 120. The desired input voltage may be one of a number of input voltages supported by voltage regulator 150.

Input voltage selection logic 113 and 123 may select the input voltage of processors 110 and 120, respectively, by communicating the desired input voltages from storage locations 114 and 124, respectively, to voltage regulator 150 through interface 151 and 152, respectively. Voltage regulator 150 receives and interprets requests to generate a number of desired voltage levels, and to generate a desired voltage level for processor 110, which is provided to processor 110 through interface 151, and a desired voltage level for processor 120, which is provided to processor 120 through interface 152.

In this embodiment, input voltage selection logic 113 and 123 also include logic to set the input voltage to an optimal level in connection with a VM exit, regardless of the contents of input voltage storage locations 114 and 124, respectively. Therefore, even if a guest is running on processor 110 or 120 at an input voltage that is not optimal, the input voltage will automatically be returned to the optimal level for running the VMM. Setting the input voltage to an optimal level in connection with a VM exit may be accomplished in any manner. For example, in one embodiment, it may be accomplished by including microinstructions within the VM exit microcode to store the contents of the input voltage storage locations in a virtual machine control structure, and load the input voltage storage location with an optimal value. In another embodiment, the input voltage selection logic may be designed to communicate the contents of the input voltage storage location to the voltage regulator only when the contents are changed, and to communicate an optimal value to the voltage regulator in connection with a VM exit.

Also, in this embodiment, operating point control logic 112 includes clock frequency selection logic 115, and operating point control logic 122 includes clock frequency selection logic 125. Clock frequency selection logic 115 is to select the clock frequency for processor 110, and clock frequency selection logic 125 is to select the clock frequency for processor 120. Operating point control logic 112 also includes clock frequency storage location 116, which may be a programmable register or any other storage location that may be set by software to indicate a desired clock frequency for processor 110, and clock frequency selection logic 125 also includes clock frequency storage location 126, which may be a programmable register or any other storage location that may be set by software to indicate a desired clock frequency for processor 120. The desired clock frequency may be one of a number of clock frequencies supported by clock units 117 and 127.

Clock frequency selection logic 115 and 125 may select the clock frequency of processors 110 and 120, respectively, by communicating the desired clock frequency to clock units 117 and 127, respectively. Clock units 117 and 127 receive a clock signal through interfaces 161 and 162, respectively, and generate the desired clock frequency, for example by dividing the clock signal.

In this embodiment, clock frequency selection logic 115 and 125 also include logic to set the clock frequency to an optimal level in connection with a VM exit, regardless of the contents of clock frequency storage locations 116 and 126, respectively. Therefore, even if a guest is running on processor 110 or 120 at a clock frequency that is not optimal, the clock frequency will automatically be returned to the optimal level for running the VMM. Setting the clock frequency to an optimal level in connection with a VM exit may be accomplished in any manner. For example, in one embodiment, it may be accomplished by including microinstructions within the VM exit microcode to store the contents of the clock frequency storage locations in a virtual machine control structure, and load the clock frequency storage location with an optimal value. In another embodiment, the clock frequency selection logic may be designed to communicate the contents of the clock frequency storage location to the clock unit only when the contents are changed, and to communicate an optimal value to the clock unit in connection with a VM exit.

Virtual machine control logic 111 and 121, operating point control logic 112 and 122, input voltage selection logic 113 and 123, and clock frequency selection logic 115 and 125 may be microcode, programmable logic, hard-coded logic, or any other form of control logic within processor 110 or 120 respectively. In other embodiments, such control logic may be implemented in any form of hardware, software, or firmware, such as a processor abstraction layer, within a processor or within any component accessible or medium readable by a processor, such as memory 130.

Virtual machine control logic 111 and 121, operating point control logic 112 and 122, input voltage selection logic 113 and 123, and clock frequency selection logic 115 and 125 cause processors 110 and 120 to execute portions of method embodiments of the present invention, such as the method embodiment described below with reference to FIG. 2, for example, by causing processors 110 and 120 to include the execution of one or more micro-operations, e.g., to support virtualization or to set an operating point condition, in its response to virtualization instructions or other instructions from a host or guest.

Figure 2:
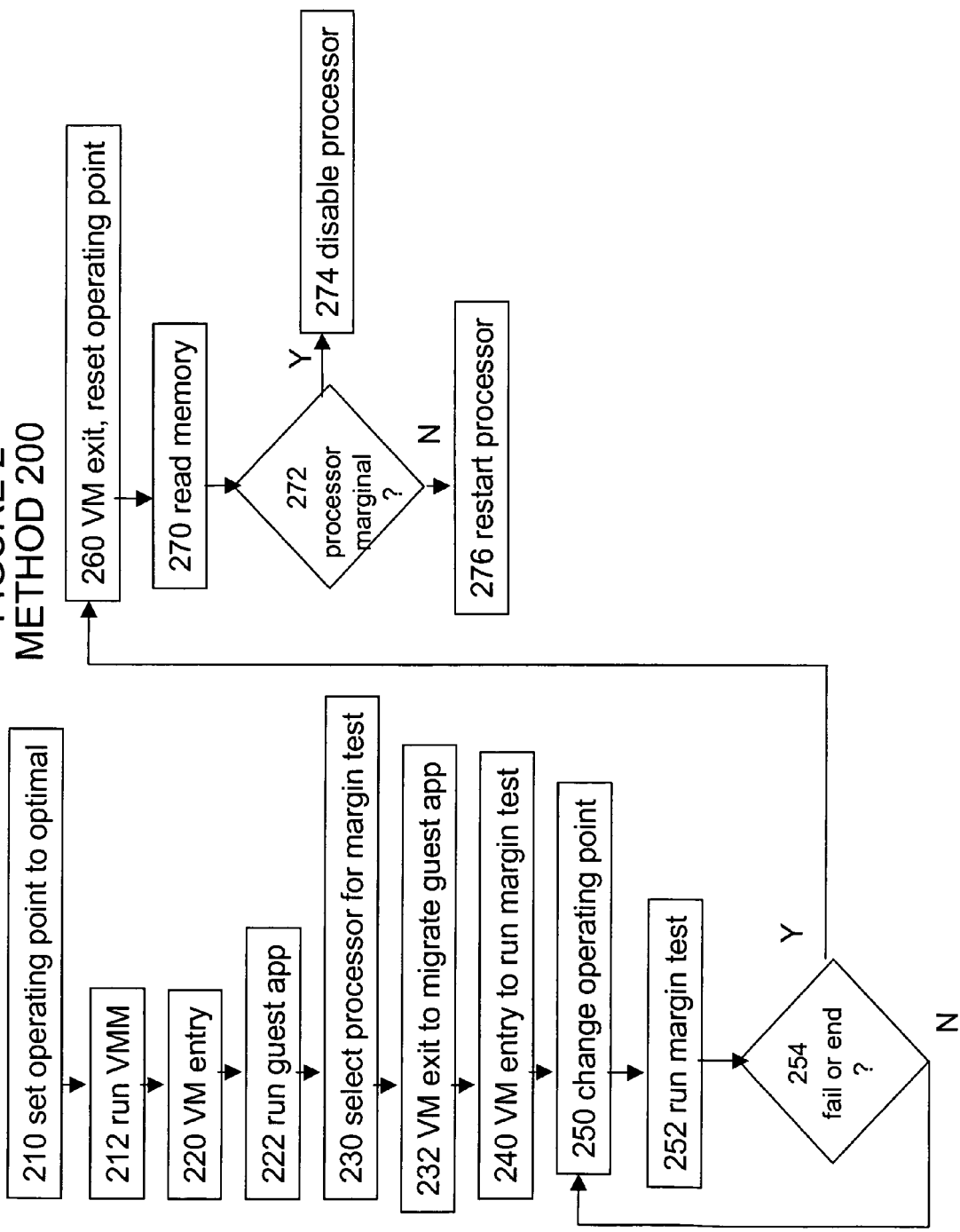
FIG. 2 illustrates an embodiment of the present invention in a method for a performing an in situ processor margin test.

FIG. 2 illustrates an embodiment of the present invention in method 200, a method for in situ processor margin testing. Although method embodiments are not limited in this respect, reference is made to system 100 of FIG. 1 to describe the method embodiment of FIG. 2.

In box 210 of FIG. 2, the operating point, including the input voltage and clock frequency, of a first processor, e.g., processor 110, is set to an optimal condition. This setting of the operating point may occur automatically as part of the powering up of system 100. In box 212, a VMM begins or continues to run on processor 110 at the optimal operating point.

In box 220, a VM entry occurs on processor 110. In box 222, a guest application begins or continues to run on processor 110.

In box 230, processor 110 is selected for in situ margin testing. This selection may be made by a VMM running on processor 120 or another processor in system 100, by a user of system 100, or by any other means. The selection may be made from time to time in order to determine whether processor 110 is marginal, e.g., whether processor 110 does not operate at all conditions within a desired window around the optimal operating point, or whether an input voltage margin, clock frequency margin, or other margin of processor 110 has degraded significantly since a previous margin test.

In box 232, the guest application is migrated from processor 110 to processor 120. This migration may be accomplished by the VMM causing a VM exit on processor 110, and a VM entry on processor 120 to run the guest application.

In box 240, a VM entry occurs on processor 110.

In box 250, the operating point of processor 110 is changed. Changing the operating point may include lowering the input voltage and/or the clock frequency. Testing the processor at a reduced input voltage may be desirable to identify processors having transistors whose threshold voltage has decreased due to hot electron effects. Lowering the input voltage may be accomplished by setting a register or other storage location in processor 110, such as input voltage storage location 114, to one of a number of input voltages supported by a voltage regulator in system 100. Testing the processor at a reduced clock frequency may be desirable to identify processors having dynamic nodes whose leakage current has increased due to a weakened dielectric. Lowering the clock frequency may be accomplished by setting a register or other storage location in processor 110, such as clock frequency storage location 116, to one of a number of clock frequencies supported by a clock unit in processor 110.

In box 252, a margin test program runs as a guest on processor 110. The margin test program may be a test program designed to exercise as many transistors and nodes as possible on processor 110, or may be any other software executable by processor 110. Also in box 252, information regarding the margin test is written to system memory. This information may include any information that may be useful for evaluating the results of the margin test and/or determining whether the margin test passed or failed. In box 254, if the margin test ends and the operating point has been changed as far as desired, or if the margin test fails, then, in box 260, a VM exit occurs and the operating point is returned to the optimal condition. Otherwise, method 200 returns to box 250.

In box 270, the memory is read to evaluate the results of the margin test. The memory may be read by a VMM running on processor 120 in the event that processor 110 cannot recover from a failure resulting from operation at the margin test conditions. In box 272, the results of the margin test are evaluated. If the results indicate that processor 110 is marginal, then, in box 274, processor 110 may be disabled or a warning message may be delivered to an operator of system 100. If not, then in box 276, processor 110 may be rebooted or otherwise restarted and made available for running application software.

Within the scope of the present invention, method 200 may be performed in a different order, with illustrated boxes omitted, with additional boxes added, or with a combination of reordered, omitted, or additional boxes.

Processors 110 and 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for in situ processor margin testing have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   virtual machine control logic to transfer control of the apparatus between a virtual machine monitor and a guest; and
   operating point control logic to set the operating point of the apparatus in connection with a transfer of control of the apparatus to the virtual machine monitor, the operating point control logic including at least one of input voltage selection logic to select one of a plurality of input voltages and clock frequency selection logic to select one of a plurality of clock frequencies.

2. The apparatus of claim 1, wherein the operating point control logic is to set the operating point of the apparatus to an optimal condition in connection with a transfer of control of the apparatus to the virtual machine monitor.

3. The apparatus of claim 1, wherein the operating point control logic includes:
   input voltage selection logic to select one of a plurality of input voltages; and
   clock frequency selection logic to select one of a plurality of clock frequencies.

4. A system comprising:
   a first processor including:
      first virtual machine control logic to transfer control of the first processor between a virtual machine monitor and a guest; and
      first operating point control logic to set the operating point of the first processor in connection with a transfer of control of the first processor to the virtual machine monitor, the first operating point control logic including at least one of first input voltage selection logic to select one of a plurality of input voltages and first clock frequency selection logic to select one of a plurality of clock frequencies; and
   a second processor including:
      second virtual machine control logic to transfer control of the second processor between the virtual machine monitor and the guest; and
      second operating point control logic to set the operating point of the second processor in connection with a transfer of control of the second processor to the virtual machine monitor, the second operating point control logic including at least one of second input voltage selection logic to select one of a plurality of input voltages and second clock frequency selection logic to select one of the plurality of clock frequencies; and
   a memory coupled to the first processor and the second processor.

5. The system of claim 4, wherein:
   the first operating point control logic is to set the operating point of the first processor to an optimal condition in connection with the transfer of control of the first processor to the virtual machine monitor; and
   the second operating point control logic is to set the operating point of the second processor to an optimal condition in connection with the transfer of control of the second processor to the virtual machine monitor.

6. The system of claim 4, further comprising:
   a first voltage regulator; and
   an interface to communicate the input voltage selection from the first processor to the first voltage regulator and to provide the input voltage from the first voltage regulator to the first processor.

7. The system of claim 4, further comprising a clock source, wherein the first processor includes a clock unit to convert the frequency of the clock source to the clock frequency selected by the first clock frequency selection logic.

8. The system of claim 4, further comprising a memory controller to allow the first processor the store information in the memory during a margin test, and to allow the second processor to read the information.

* * * * *

UNITED STATES PATENT AND TRADEMARK OFFICE
CERTIFICATE OF CORRECTION

PATENT NO. : 7,665,005 B2 Page 1 of 1
APPLICATION NO. : 11/509856
DATED : February 16, 2010
INVENTOR(S) : Craig P. Szydlowski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this

Fourth Day of January, 2011

David J. Kappos
*Director of the United States Patent and Trademark Office*